April 27, 1937.  C. OMAN  2,078,680
REMOTE MEASURING SYSTEM
Filed May 11, 1935
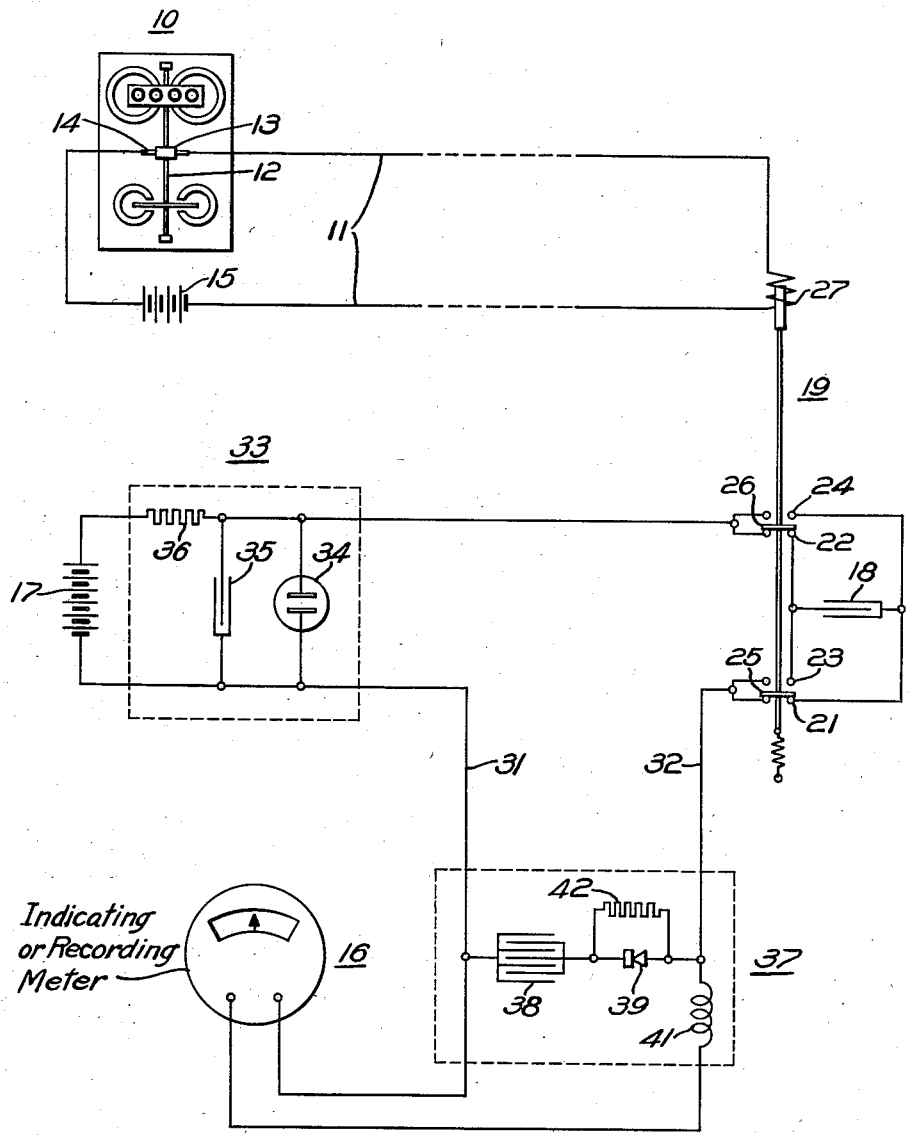
WITNESSES:
INVENTOR
Carl Oman.
ATTORNEY Patented Apr. 27, 1937

2,078,680

UNITED STATES PATENT OFFICE 2,078,680

REMOTE MEASURING SYSTEM

Carl Oman, East Orange, N. J., assignor to Westinghouse Electric & Manufacturing Company, East Pittsburgh, Pa., a corporation of Pennsylvania Application May 11, 1935, Serial No. 21,009

9 Claims. (Cl. 177—351)

My invention relates, generally, to measuring or telemeter systems, and, more particularly, to remote measuring and indicating systems of the impulse type, wherein electrical impulses or impulse effects are produced by a transmitter in response to a current, power or voltage characteristic of a circuit or in response to any other characteristic or quantity which is to be indicated or recorded at a remote station.

The object of my invention generally stated is to provide a remote measuring or telemeter system which shall be of simple construction, efficient and accurate in operation and which may be readily and economically manufactured and installed.

A more specific object of my invention is to provide a remote measuring system wherein the receiver is unaffected by variations in the voltage of the power source at the receiving station.

Another object of my invention is to provide for utilizing an impulse filter in an impulse remote measuring system to control the functioning of the meter or indicating device in response to the impulses received.

A still further object of my invention is to provide for supplying the receiver of an impulse measuring system with a constant operating voltage by means of a voltage regulator.

A further object of my invention is to provide a receiver for a remote measuring or telemeter system of the impulse condenser type wherein the condenser impulses are stored and the stored energy gradually fed to the meter or indicating device.

A still further object of my invention is to provide, in a remote measuring or telemeter receiver comprising a meter and calibrating condenser, for storing the condenser charging impulses and gradually feeding the stored energy to the meter.

Another object of my invention is to provide a telemetering receiver of the impulse condenser type which is unaffected by variations in the voltage of its power source and wherein the meter or indicating device is actuated by leakage current from a condenser storage reservoir receiving energy from an impulse or calibration condenser.

These and other objects of the invention will become more apparent from a study of the following detailed description in conjunction with the drawing wherein the single figure constitutes a diagrammatic illustration of a remote measuring or telemeter system embodying the principal features of my invention.

In practicing my invention in its preferred form, an impulse or calibration condenser which provides the energy for operating the indicating or recording meter is alternately charged and discharged with reversed polarity from a source of direct current through the operation of a reversing switch or relay. The reversing switch is actuated by current impulses transmitted over a suitable channel by an impulse transmitter which may be in the form of a contact making watthour meter, or the like, which transmits impulses in accordance with the quantity being measured. The calibration condenser is connected to a direct current power source at the receiving station through a suitable voltage regulator such, for example, as a glow discharge tube in order to subject the condenser to a constant charging voltage and thereby insure a uniform charging current for each impulse. The charging current of the calibration condenser is prevented from flowing directly into the meter or indicating device by means of a choke coil and is directed into a filter or condenser reservoir comprising a large condenser and a rectifier having a resistor in parallel therewith. The energy stored in the reservoir slowly leaks out through the resistor and flows through the meter circuit which gives the meter a smooth action and produces a deflection substantially proportional to the impulse rate.

Referring now to the drawing, there is shown at 10 an impulse transmitter which is adapted to transmit current impulses over a suitable channel represented by line conductors 11 at a rate dependent upon the magnitude of a quantity or characteristic that is to be indicated or recorded at a remote station.

In this instance, the transmitter 10 is in the form of a watthour meter having a moving element 12 provided with a commutator 13 and cooperating brushes 14 which are connected to the transmitting channel 11 energized by a source of direct current power 15, as shown. As will be readily understood, the watthour meter may be connected to measure the power flowing in a load circuit and thereby transmit impulses at a rate proportional to the quantity of power in the circuit or any other suitable device may be used for transmitting impulses in accordance with a predetermined quantity or characteristic.

In order to indicate or record or both indicate and record the measurement at a remote station, there is provided a meter or instrument 16. In this instance, the meter 16 is illustrated as a direct current milliammeter.

The instrument 16 is actuated in accordance with the rate at which the impulses are transmitted from the sending station by a local source of energy represented as a battery 17 of large capacity and voltage.

The principal features of this invention reside in the provisions made for effecting the operation of the instrument 16 in a smooth and steady manner and to cause it to accurately function in accordance with the impulse rate or in other words to accurately reproduce the measurement made at the transmitting station.

The energization of the instrument 16 is controlled primarily by means of a small condenser 18 which may be referred to as a calibration condenser. The charging and discharging of the calibration condenser 18 is controlled by a reversing switch 19 which, when operated, functions to alternately charge the condenser in opposite directions from the direct-current source or station battery 17.

Any suitable type of reversing switch may be used such for example as a telephone relay as shown diagrammatically having back contacts 21 and 22, front contacts 23 and 24, with cooperating armatures 25 and 26 actuated by the coil 27 connected in the transmitting circuit 11.

As will be observed, when the reversing switch 19 is deenergized, as shown, the calibration condenser 18 is connected across the source 17 in series with the instrument 16 through the back contacts 21 and 22 which charges the condenser with current of one polarity. When the reversing switch is actuated, the condenser is discharged and charged with current of the opposite polarity through the contacts 23 and 24.

It is apparent that regardless of the position of the reversing switch 19, the charging current impulses of the calibration condenser 18 always flow in the same direction through the conductors 31 and 32 of the instrument circuit. In this instance, the calibration condenser 18 is of such capacity that it is fully charged and discharged in response to each operation of the reversing switch 19 regardless of the speed at which the impulses from the transmitter are received.

In order that the meter 16 may be caused to accurately reproduce the measurement at the transmitting system, it is necessary that the calibration condenser 18 be charged with a definite quantity of electricity for each impulse. The total quantity of electricity which is then sent through the meter 16 is proportional to the impulse rate.

In order to accomplish this function, provision is made for maintaining the voltage, to which the calibration condenser is subjected by the operations of the reversing switch, at a substantially constant value at all times. This is accomplished by means of a suitable voltage regulator 33 interposed between the station battery 17 and the calibration condenser 18. As will be readily understood, the voltage of the station battery may vary over a considerable range due to heavy loads and charging operations and, therefore, it is necessary to utilize a voltage regulator of some type to control the voltage to which the calibration condenser is subjected.

In this instance, the voltage regulator 33 is of the electronic type comprising a glow discharge tube 34, a condenser 35 and a limiting resistor 36. The tube 34 functions to maintain the voltage drop across its terminals at a constant value, such, for example, as at 90 volts where the voltage of the station battery may vary from 125 to 140 volts. It is to be understood, however, that any other suitable type of regulator may be utilized instead of the electronic type illustrated.

It is now apparent that the operation of the reversing switch 19 in reversely charging the calibration condenser 18 to full capacity provides for the flow of a definite amount of current in the charging circuit for each impulse transmitted. Due to the connections of the reversing switch to the constant voltage power source, comprising battery 17 and regulator 33 and to the condenser 18, the charging currents, regardless of the polarity of the condenser, always flow through the charging circuit and into the storage condenser 38 in the same direction. Thus the energy which is stored in the storage condenser 38 is always proportional to the quantity being measured by the transmitter 10.

In order to steady the operation of the meter 16 and to cause it to deflect or record substantially proportional to the impulse rate, provision is made for storing the charging current impulses of the calibration condenser 18 and gradually feeding the stored energy to the meter.

In this instance, this is accomplished by means of an impulse filter 37 interposed between the calibration condenser and the meter. The filter comprises generally a storage condenser 38, of large capacity as compared to the capacity of the calibration condenser 18, and a valve or rectifier device 39 connected in parallel with the meter. The rectifier or valve 39 is illustrated in the form of a Rectox valve although any other suitable type of unidirectional device may be used.

In order that the charging current impulses flowing in the meter circuit may be directed into the storage condenser 38, a choke coil 41 is interposed in the circuit in order to resist the flow of impulses, the path of the least resistance then being through the valve 39 into the storage condenser 38.

In order to provide for gradually feeding the stored energy to the meter 16, a leakage resistor 42 is connected in shunt relation with the valve 39. As will be readily understood, this provides a path for the energy stored in the storage condenser 38 to gradually leak back through the choke coil 41 into the meter circuit, the result being that the meter has a smooth action and produces a deflection in proportion to the impulse rate.

In view of the foregoing, it is apparent that the invention has two important aspects, namely the provision for producing uniform impulse conditions at the receiver regardless of variations in the source of voltage and in transforming these uniform impulses into a steady flow of current for energizing the indicating or recording meter. No special apparatus in the form of transformers or the like is required in order to produce this overall result.

While the system disclosed is particularly adapted for high rate impulse operation used primarily for load indication, it is apparent that it may be also utilized for other telemeter purposes.

Since certain changes may be made in the above described construction and different embodiments of the invention may be made without departing from the spirit thereof, as set forth in the appended claims, it is intended that all matter contained in the above description or shown in the accompanying drawing shall be in-

I claim as my invention:

1. An impulse measuring system comprising means for transmitting current impulses at a rate proportional to a measurement rate, a calibration condenser, a source of constant voltage power, means responsive to the impulses for alternately charging the calibration condenser to full capacity with current of opposite polarity from said power source, an electrical measuring instrument connected in the condenser charging circuit, and means including a second condenser connected in parallel circuit relation to the measuring instrument for receiving and storing the charging current impulses of the calibration condenser and gradually feeding the stored energy to the measuring instrument.

2. An impulse measuring system comprising means for transmitting current impulses at a rate proportional to a measurement rate, a calibration condenser, a source of constant voltage power means responsive to the impulses for alternately charging the calibration condenser to full capacity with current of opposite polarity from said power source, an electrical measuring instrument connected in the calibration condenser charging circuit means including a uni-directional current conducting device and a storage condenser interposed between the calibration condenser and measuring instrument for receiving and storing the condenser charging currents, and means associated with the uni-directional current conducting device whereby the accumulated energy in the storage condenser may slowly leak back through the measuring instrument.

3. In an impulse measuring system, in combination, an impulse transmitter, switching means actuated in accordance with the rate of operation of the transmitter, a source of constant voltage, a first condenser alternately charged to full capacity in opposite directions from said source of constant voltage in response to the operation of the switching means, a meter connected in the charging circuit, and means including a second condenser of relatively large capacity interposed in the charging circuit adapted to receive and store the charging impulses and for gradually feeding the stored energy to the meter.

4. In an impulse measuring system, an impulse transmitter at the transmitting station, reversing switch means at the receiving station responsive to the impulses produced by the transmitter, a source of constant voltage power, a calibration condenser which is alternately charged in opposite directions from the power source by the reversing switch, said condenser being of such capacity that it is completely charged on each operation of the reversing switch, a rectifier and storage condenser of relatively large capacity connected in series circuit relation with the calibration condenser, a meter connected in parallel circuit relation with the rectifier and storage condenser, means interposed in the meter circuit to direct the charging current impulses of the calibration condenser into the storage condenser through the rectifier, and means associated with the rectifier whereby the stored energy in the storage condenser may gradually feed back through the meter.

5. In an impulse measuring system, an impulse transmitter operable to transmit current impulses at a rate proportional to a quantity or condition affecting the transmitter, a reversing switch responsive to said impulses, a source of constant voltage power, a calibration condenser, a storage condenser, a rectifier device, said condensers and rectifier device being connected across the power source through the reversing switch whereby the operation of the reversing switch alternately charges the calibration condenser in opposite directions and discharges it, a meter connected across the rectifier and storage condenser, means in the meter circuit for directing the charging current impulses of the calibration condenser into the storage condenser and means associated with the rectifier to permit the stored energy in the storage condenser to gradually flow into the meter circuit.

6. In an impulse measuring system, an impulse transmitter operable to transmit current impulses at a rate proportional to a quantity or condition affecting the transmitter, a reversing switch responsive to said impulses, a source of constant voltage power, a calibration condenser, a storage condenser, a rectifier device, said condensers and rectifier device being connected across the power source through the reversing switch whereby the operation of the reversing switch alternately charges the calibration condenser in opposite directions and discharges it through the rectifier device into the storage condenser, a meter connected across the rectifier and storage condenser, a choke coil in the meter circuit to prevent the charging current impulses of the calibration condenser from flowing through the meter and for causing a flow of said impulses into the storage condenser, and a resistor connected in shunt relation with the rectifier whereby the energy stored in the storage condenser may gradually flow through the meter.

7. In an impulse measuring system, means for transmitting current impulses at a rate proportional to a measurement, a calibration condenser, a source of constant voltage power, switch means responsive to said impulses for alternately charging said condenser with opposite polarity to full capacity from the power source, a measuring instrument connected in the charging circuit, and means interposed between the measuring instrument and calibration condenser adapted to receive and store the charging currents and gradually feed the stored energy to the measuring instrument.

8. In an impulse measuring system, an impulse transmitter at the transmitting station, a reversing switch at the receiving station actuated by the impulses produced by the transmitter, a source of constant voltage power, a calibration condenser disposed to be alternately charged with opposite polarity from the power source by the reversing switch, said condenser being of such capacity that it is fully charged on each operation of the reversing switch, a meter, and means connecting the meter to the calibration condenser and power source adapted to collect and store the charging currents of the calibration condenser and gradually feed the stored energy to the meter.

9. In an impulse measuring system, in combination, an impulse transmitter for transmitting current impulses at a rate dependent on the magnitude of a measured quantity, a meter to be actuated in accordance with the measured quantity, a source of constant voltage power, a calibration condenser, a circuit including said meter for charging the condenser from the power source, means actuated by said current impulses for alternately reversing the circuit connections to the condenser to fully charge the condenser with opposite polarity and discharge said condenser in response to each impulse, and means including a second condenser interposed in the charging circuit between the meter and the calibration condenser and power source for preventing the flow of charging currents through the meter and for collecting the charging currents and gradually feeding the stored energy to the meter.

CARL OMAN.